(12) United States Patent
Outlaw

(10) Patent No.: US 8,392,600 B2
(45) Date of Patent: Mar. 5, 2013

(54) DYNAMIC STREAM SWITCH CONTROL

(75) Inventor: Bradley Outlaw, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 209 days.

(21) Appl. No.: 12/559,029

(22) Filed: Sep. 14, 2009

(65) Prior Publication Data

US 2011/0066673 A1 Mar. 17, 2011

(51) Int. Cl.
G06F 15/16 (2006.01)
(52) U.S. Cl. ........................... 709/233; 709/231
(58) Field of Classification Search ........... 709/231–233
See application file for complete search history.

(56) References Cited

U.S. PATENT DOCUMENTS

| | | | |
|---|---|---|---|
| 6,938,047 B2 | 8/2005 | Kryeziu | |
| 7,400,764 B2 | 7/2008 | Kryeziu | |
| 7,496,676 B2 | 2/2009 | Kryeziu | |
| 7,818,444 B2 * | 10/2010 | Brueck et al. | 709/231 |
| 7,873,760 B2 | 1/2011 | Versteeg | |
| 2002/0133247 A1 | 9/2002 | Smith et al. | |
| 2007/0079327 A1 | 4/2007 | Khoo et al. | |
| 2007/0156679 A1 | 7/2007 | Kretz et al. | |
| 2007/0192812 A1 | 8/2007 | Pickens et al. | |
| 2007/0220552 A1 | 9/2007 | Juster et al. | |
| 2007/0226365 A1 | 9/2007 | Hildreth et al. | |
| 2007/0282905 A1 | 12/2007 | Karlberg | |
| 2008/0310825 A1 | 12/2008 | Fang et al. | |
| 2009/0063975 A1 | 3/2009 | Bull et al. | |
| 2009/0094248 A1 | 4/2009 | Petersen | |
| 2009/0099919 A1 | 4/2009 | Schultheiss et al. | |
| 2009/0307367 A1 | 12/2009 | Gigliotti | |
| 2010/0057928 A1 | 3/2010 | Kapoor et al. | |
| 2010/0162330 A1 | 6/2010 | Herlein et al. | |

OTHER PUBLICATIONS

SWF File Format Specification, Version 10, Adobe Systems Incorporated, Nov. 2008 (http://www.adobe.com/devnet/swf/pdf/swf_file_format_spec_v10.pdf).
Bill Birney, "Intelligent Streaming," Microsoft Corporation, May 2003, retrieved from internet: http://www.microsoft.com/windows/windowsmedia/howto/articles/intstreaming.aspx?pf=true, 7 pages.
"Move Networks Solutions," Move Networks, Inc., retrieved from internet on Aug. 29, 2008: http://www.movenetworks.com/why-move/solutions, 4 pages.
"Move Media Player," Move Networks, Inc., retrieved from internet on Aug. 29, 2008: http://www.movenetworks.com/wp-content/uploads/move-media-player.pdf, 3 pages.
"Move Adaptive Stream," Move Networks, Inc., retrieved from internet on Aug. 29, 2008: http://www.movenetworks.com/wp-content/uploads/move-adaptive-stream.pdf, 4 pages.
"Our Clients," Move Networks, Inc., retrieved from internet on Aug. 29, 2008: http://www.movenetworks.com/why-move/our-clients, 3 pages.
"Our Clients," Move Networks, Inc., retrieved from the internet on Aug. 29, 2008.

(Continued)

Primary Examiner — David Lazaro
(74) Attorney, Agent, or Firm — Finch & Maloney, PLLC

(57) ABSTRACT

In general, in one aspect, streaming content is received from a server. A condition indicative of a cycle of switching versions of the streaming content during playback of the streaming content is determined at a client-side application, the versions having different resolutions requiring different network and processing resources. In response to the determined condition, up-switching to a stream version having a bit rate that meets or exceeds a locked out bit rate is prevented. The prevented up-switching is allowed after expiration of a predetermined condition.

19 Claims, 8 Drawing Sheets

OTHER PUBLICATIONS

Office Action in U.S. Appl. No. 12/201,952 mailed Apr. 30, 2010, 10 pages.
"Move Media Player, Move Networks", http://web.archive.org/web/20080516004150/http://www.movenetworks.com/wpcontent/uploads/move-media-player.pdf, May 16, 2008, 3 pages.
"Move Adaptive Stream, Move Network,", web page at http://web.archive.org/web/20081010161808/http://www.movenetworks.com/wpcontent/uploads/ move-adaptive-stream.pdf, Oct. 10, 2008, 4 pages.
"Move Networks, Move Networks Solutions", web page at http://web.archive.org/web/20080913152314/http://www.movenetworks.com/why-move/solutions, as available via the Internet and printed Apr. 19, 2012, 3 pages.
"Our Clients, Move Networks,", web page at http://web.archive.org/web/20080831021014/http://www.movenetworks.com/why-move/our-clients, as available via the Internet and printed Apr. 19, 2012, 1 page.
Birney, Bill , "Intelligent Streaming", web page at http://www.microsoft.com/windows/windowsmedia/howto/articles/intstreaming.aspx, as available via the Internet and printed Apr. 19, 2012, 4 pages.
Office Action in U.S. Appl. No. 12/201,952 mailed Oct. 2, 2012, 13 pages.

* cited by examiner

DYNAMIC STREAM SWITCH CONTROL

BACKGROUND

The present disclosure relates generally to delivering and presenting multimedia content.

Streaming is a technique for delivering multimedia content to end-users. Streaming involves continuously displaying media content to a user while the content is being delivered to the user. Streaming can be used to deliver various types of digital media to end-users. Streaming media can include, for example, recorded (e.g., recorded video) and/or live media content (e.g., video from a user's webcam).

Publishers can create content for streaming by encoding content (e.g., audio and video) with one or more codecs. A streaming media server can then receive and transmit created streams over a network (e.g., the Internet) to a client device. The client device can include a client-side player that decompresses and displays streams for an end-user.

Streaming media environments can use virtual machines to present streaming content to end-users. A virtual machine is a self-contained operating environment that allows programs to be run within the virtual machine itself as though the virtual machine were a stand-alone computer. Virtual machines can be programs themselves, embedded within an operating system or other software application, or otherwise installed on a computer. One example of a virtual machine is the ADOBE® FLASH® Player runtime (available from Adobe Systems Incorporated of San Jose, Calif.), which can be used to run FLASH® files including ACTIONSCRIPT® and SWF files (e.g., files formatted according to the SWF File Format Specification (Version 10) as published by Adobe Systems Incorporated of San Jose, Calif. (http://www.adobe.com/devnet/swf/pdf/swf_file_format_spec_v10.pdf)).

Customized image viewers and video players can run on virtual machines and present streaming media to end-users. These customized applications can be used to facilitate web applications in providing interactive rich media content, Applications configured to execute on the ADOBE® FLASH® platform can be included in SWF files, which can be processed by client-side SWF player software. The media content itself can be kept separate from the SWF file and can be loaded into a SWF for playback at runtime.

Playlists can be used during streaming. A playlist can include a list of streams queued up for playback. The streams in the playlist can be streamed to the user and played from a source (e.g., the streaming media server) one after the other in the order they are queued. Streams from a playlist can be presented to end-users through customized image viewers, video players and audio players, which can be associated with various other applications.

SUMMARY

This specification describes technologies relating to controlling dynamic stream version switching. Implementations consistent with this disclosure can provide a time-based locking mechanism configurable to prevent undesirable up-switching and down-switching among different versions (e.g., different bit rate encodings) of streaming content.

In general, in one aspect, a computer-implemented method is provided. The method includes: receiving, from a server, streaming content queued for client-side playback from the server; determining, at a client-side application, a condition indicative of a cycle of switching versions of the streaming content during playback of the streaming content, the versions having different bit rates requiring different network and processing resources; responsive to the determined condition, preventing up-switching to a stream version having a bit rate that meets or exceeds a locked out bit rate; displaying the streaming content on a client-side display device at a bit rate below the locked out bit rate when up-switching is prevented; and allowing the prevented up-switching to a stream version having a bit rate that meets or exceeds the locked out bit rate after expiration of a predetermined condition. At least the determining, the preventing and the allowing are performed by at least one data processing apparatus. Other embodiments can include corresponding systems, apparatus and computer program products.

Implementations can include one or more of the following features. For example, in some implementations, determining a condition indicative of a cycle of switching versions involves identifying a stream version down-switching that replaces a first version of the streaming content with a downgraded version having a bit rate that requires less network and processing resources relative to a bit rate of the first version. The stream version down-switching can be responsive to a number of dropped frames associated with the streaming content exceeding a target number. The stream version down-switching can comprise a change in bit rate encodings from a first bit rate encoding to a second bit rate encoding lower than the first bit rate encoding.

The preventing can involve preventing any up-switching to a bit rate encoding that meets or exceeds a bit rate of the first bit rate encoding. The preventing can involve allowing up-switching to bit rate encodings having bit rates below the bit rate of the first bit rate encoding during the preventing. Allowing the prevented up-switching after expiration of a predetermined condition can involve allowing the prevented up-switching after expiration of a predetermined amount of time.

In some implementations, the method further includes, prior to the preventing, accessing a client-side buffer associated with the streaming content and determining whether the buffer is outputting the first version of the streaming content or a version of the streaming content having a bit rate higher than the bit rate of the first version. In such implementations, the method further includes preventing any up-switching to a stream version having a bit rate that meets or exceeds the bit rate of the first version, when the buffer is outputting the first version; and allowing stream version up-switching without the preventing, when the buffer is outputting a version of the stream having a bit rate higher than the bit rate of the first version.

In some implementations, the method further includes, in response to an attempt to up-switch to an upgraded version having a bit rate that meets or exceeds the locked out bit rate when up-switching is prevented, displaying on the client-side display device a notification that the attempted up-switch is being prevented. In some implementations, the method further includes: tracking a number of instances of the preventing using a counter; making a determination about client-side processing resources when a threshold number of preventing instances is exceeded; and preventing up-switching to a stream version having a bit rate that meets or exceeds the locked out bit rate for an entire duration of the streaming content based on the determination about client-side processing resources.

In general, in another aspect, a machine-readable storage device storing a computer program product is provided. The computer program product has instructions operable to cause one or more data processing apparatus to perform operations comprising: accessing streaming content queued for streaming to a client, the streaming content associated with at least a first bit rate version and a second bit rate version having a higher bit rate relative to the first bit rate version; streaming, to the client over a network, the first bit rate version when a switching lock that locks out the second bit rate is active, the switching lock being activated at the client in response to a condition indicative of a cycle of switching versions of the streaming content during playback of the streaming content; receiving from the client an up-switch request for an upgraded version of the streaming content when the switching lock is inactive, the switching lock deactivating after expiration of a predetermined condition; and streaming the second bit rate version to the client via the network in response to the up-switch request.

Implementations can include one or more of the following features. For example, in some implementations, the condition indicative of a cycle of switching versions comprises a stream version down-switching that replaces the second bit rate first version of the streaming content with the first bit rate version. The stream version down-switching being responsive to a number of dropped frames associated with the streaming content exceeding a target number. The second bit rate version can have a higher bit rate encoding relative to the first bit rate version. The switching lock can prevent any up-switching to a bit rate encoding that meets or exceeds the encoding bit rate of the second bit rate version.

In general, in yet another aspect, a system is provided. The system comprises at least one processing device and a storage device storing instructions operable to cause the at least one processor to perform operations. The operations comprise: receiving, from a server, streaming content queued for client-side playback from the server; determining, at a client-side application, that multiple versions of the streaming content are available and that one of the versions is optimal, the optimal version having a bit rate that requires less network and processing resources relative to the other of the multiple versions; responsive to the determination, activating a switching lock that prevents up-switching to a stream version having a bit rate that meets or exceeds a locked out resolution; displaying the streaming content on a client-side display device at a bit rate below the locked out resolution when the switching lock is activated; and deactivating the switching lock after expiration of a predetermined condition.

Implementations can include one or more of the following features. For example, in some implementations, the determining comprises identifying a change in bit rate encodings from a first bit rate encoding of the streaming content to a second bit rate encoding of the streaming content lower than the first bit rate encoding. Activating the switching lock can prevent any up-switching to a bit rate encoding that meets or exceeds a bit rate of the first bit rate encoding. The predetermined condition can include a predetermined amount of time.

In some implementations, the operations further include, prior to activating the switching lock, accessing output of a client-side buffer associated with the streaming content, and determining whether or not to activate the switching lock based on the buffer output. In some implementations, the operations further include: tracking a number of activations of the switching lock using a counter; making a determination about client-side processing resources when a threshold number of switching lock activations is exceeded; and maintaining the switching lock for an entire duration of the streaming content based on the determination about client-side processing resources.

The streaming content can include streams associated with a playlist. The playlist can include an arrangement of streams that are queued for client-side playback from the server. In such implementations, the determining can involve determining that multiple versions of a stream in the playlist are available and that one of the versions is optimal, the optimal version having a bit rate that requires less network and processing resources relative to the other of the multiple versions. In such implementations, the operations can further comprise: tracking a number of activations of the switching lock using a counter; making a determination about client-side processing resources when a threshold number of switching lock activations is exceeded; and maintaining the switching lock for an entire duration of the stream in the playlist based on the determination about client-side processing resources.

Aspects of the subject matter described in this specification can be implemented to realize one or more of the following and/or other advantages. Implementations consistent with this disclosure can be used to prevent an undesirable cycle of stream version switching during dynamic alteration of streaming content. A locking mechanism can lock to prevent up-switching to upgraded versions of a stream and then unlocks at a later time. In addition, an undesirable cascading down-switching effect, which can result from residual buffer data affecting a number of dropped frames, can be prevented.

During playback of streaming content (e.g., a stream in a playlist) by a client-side player, bandwidth availability and/or system resources available to the player can change (e.g., due to other applications running on the system and taking resources away from the player). In these scenarios, it may be desirable to dynamically replace the stream with a stream that has the same content but that is encoded at a different quality or resolution (e.g., bit rate) to provide the best possible playback experience. This dynamic version switching can be based on several factors, such as (1) available bandwidth, (2) number of dropped frames and (3) client-side buffer content. In some cases, however, this dynamic switching can result in an undesirable cycle of switching stream versions due to a disparity between network bandwidth and client-side processing resources.

As an example, a 500 kbps video stream can be queued for a medium to high bandwidth environment. A server then starts streaming the video and, during playback, the streaming video can be dynamically and automatically updated with higher bit rate versions (e.g., 1 Mbps) of the same video in an effort to provide the best possible playback experience. This switch can occur, for example, when the buffering, bandwidth, and frame dropping factors indicate such a switch is appropriate.

During playback of the higher-bit rate version, however, a situation can occur where the client has ample bandwidth to accommodate the higher bit rate but not enough processing resources. In this case, the higher bit rate stream may cause the system to run sluggishly due to low processing resources, even though the network has enough bandwidth to handle the stream. This can impact the number of dropped frames and trigger another version switch. For example, the streaming content can be dynamically and automatically downgraded to a lower bit rate version (e.g., a 500 kbps or 300 kbps encoding) to reduce the frame drop rate.

Once the frame dropping condition improves in response to the lowering of the bit rate, however, the system may attempt to upgrade the streaming content to a higher bit rate version again. If the processing resources are still insufficient to accommodate the higher bit rate, an undesirable cycle of upgrading and downgrading stream versions can occur. Implementations consistent with this disclosure can control this cycling by locking a stream resolution (e.g., video bit rate) into a resolution acceptable to the client-side processing resources and network bandwidth. The lock can prevent any switching to upgraded versions of streams having resolutions that meet or exceed the locked out resolution. The lock can be configured to release after expiration of a certain amount of time.

In some cases, the client-side processing resource deficiency causing sluggish performance is temporary. For example, processing resources can be temporarily taken away from the player software and given to other applications running on the system, but these processing resources may be freed up for the player at a later time. Implementations consistent with this disclosure may provide a time-based lock configurable for self release in order to allow a higher bit rate to be used again to test whether the processing resources have become available for the player (and that the bandwidth remains available). In some examples, a finite number of attempts to up-switch can be allowed before a determination is made that a higher bit rate will likely continue to offend system processing resources (e.g., cause dropped frames).

In some cases, when streaming content is dynamically and automatically down-switched to a downgraded version to reduce the number of dropped frames, a cascading down-switch effect can occur. In particular, after a down-switch, a client-side playback buffer used during playback of the streaming content may still contain substantial data from the previous, higher-resolution version of the stream. For example, after a down-switch from a 1 Mbps encoding to a 500 kbps encoding to improve a frame dropping condition, the buffer may still contain residual data from the 1 Mbps version (e.g., 20 seconds of the 1 Mbps version). As a result, the frame dropping condition may not immediately improve, since the 1 Mbps data has not yet cleared the buffer. This can then cause additional down-switching and locking at the 500 Kbps, even though the playback buffer is not yet outputting the 500 Kbps data and frame dropping information for the 500 Kbps version of the stream is not yet available. This locking and down-switching can repeat in an undesirable cascading manner.

To avoid this cascading effect, implementations consistent with this disclosure can provide a locking mechanism that prevents or delays activation of a down-switch and activation of the lock. For example, the buffer output can be inspected, prior to allowing a down-switch from a first bit rate version (500 kbps) to a lower bit rate version (300 kbps) and locking out the higher resolution (e.g., 500 kbps), to ensure that the buffer is outputting the version of the stream that is to be replaced (e.g., the 500 kbps version) and not residual data from a previous, higher version (e.g., a 1 Mbps version). If the buffer is still outputting the higher version, then the down-switching and activation of the lock can be delayed or prevented.

Details of one or more implementations are set forth in the accompanying drawings and the description below. Other aspects can be implemented in systems and computer program products, encoded on a computer-readable medium, operable to cause data processing apparatus to perform such operations. Other features, aspects and advantages will become apparent from the description, the drawings and the claims.

BRIEF DESCRIPTION OF THE DRAWINGS

Like reference numbers and designations in the various drawings indicate like elements.

DETAILED DESCRIPTION

Figure 1:
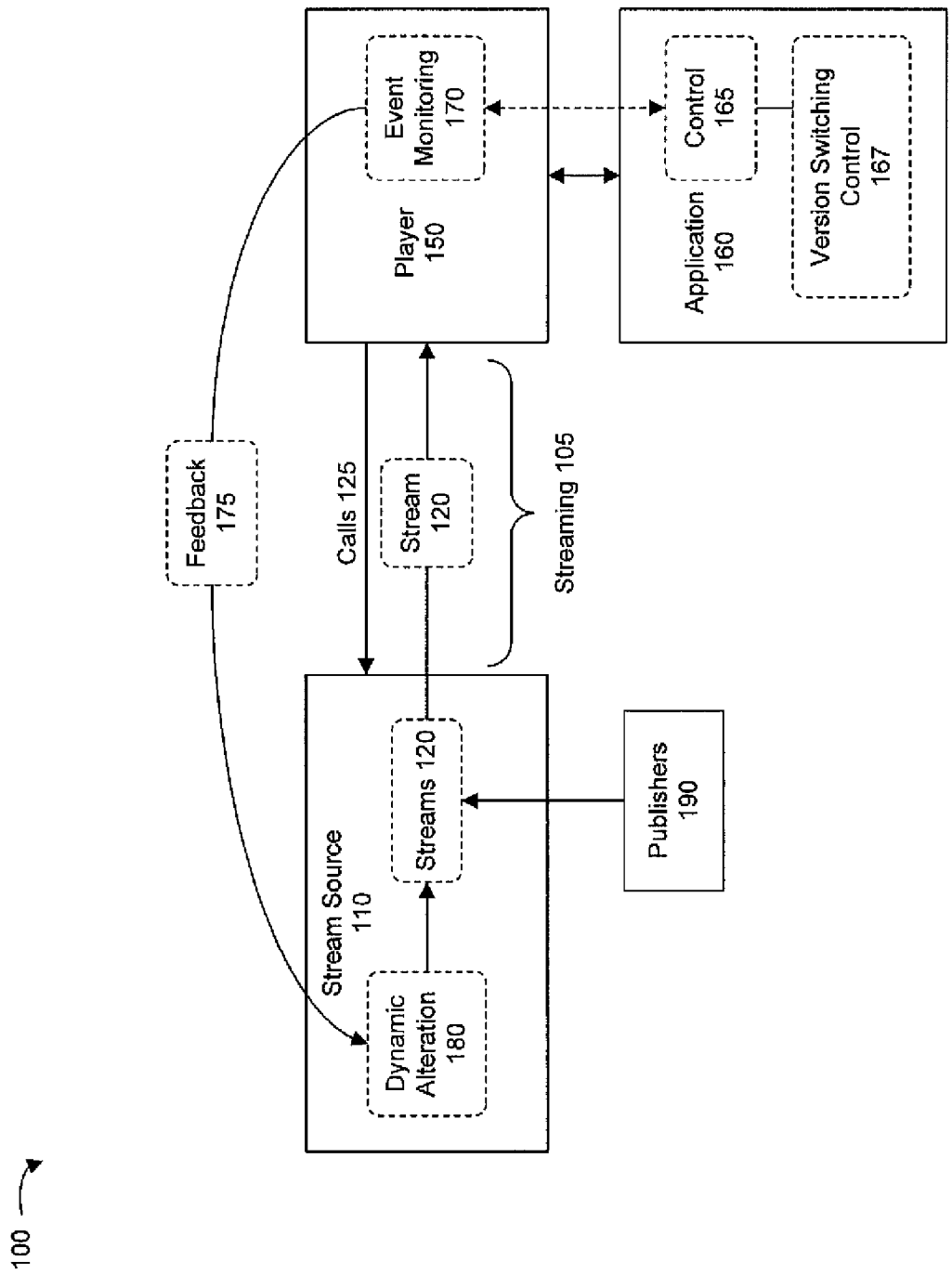
FIG. 1 is a diagram showing an example of a dataflow consistent with this disclosure.

FIG. 1 shows an example dataflow 100 in which dynamic stream version switching can be controlled to avoid version cycling during playback of one or more streams 120. The dataflow 100 is an example and not intended to be restrictive. Various modifications to the dataflow 100 are therefore possible without departing from the scope of this disclosure.

As used herein, the terms "streaming content," "content stream" and "stream" can refer to any media or other data item delivered or streamed over a network that can be presented to a user. The stream 120 can include, for example, video content, audio content and/or a combination of audio and video content. In some implementations, streams can include various other data as well, such as text-based data, still image data and/or user-defined data.

In some implementations, the stream 120 can be associated with a playlist (not shown). As used herein, a "playlist" can refer to an ordering of one or more streams that are queued to be streamed and played in the order they are queued. In some examples, playlists can be implemented in XML (extensible Markup Language) and can include various information identifying the streams in the playlist. Additional details of a playlist are described below in connection with FIG. 2.

The stream 120 can be created and stored in various formats, which can employ various compression schemes (e.g., lossy and/or lossless compression) and various data structures (e.g., raster graphics and/or vector graphics). Streams can be created and stored in formats that allow for synchronized audio and video. In some examples, a stream can include content encoded with one or more codecs (e.g., the H.264, On2 VP6, and/or Sorenson Spark video codecs). In some examples, the streams can be represented in the MPEG-4 (Moving Picture Experts Group) format, the SWF format, the FLV (Flash Video File) format and/or the F4V format, Various other formats are also possible, including Waveform Audio (WAV), Audio Interchange File Format (AIFF); Free Lossless Audio Codec (FLAC), Apple Lossless, Windows Media Audio (WMA), MP3, Advanced Audio Coding (AAC), GIF (Graphic Interchange Format), PNG (Portable Network Graphics), and HTTP (Hypertext Transfer Protocol). Other formats are also possible.

During a streaming 105 phase of the dataflow 100, the stream 120 can be streamed from a source 110 to a player 150. As used herein, "streaming" (or any other form of the term "stream" when used as a verb) refers to delivering bits of a stream such that the stream is continuously displayed to a user while the stream is being delivered to the user. When content is streamed to a destination, the content is displayed at the destination as the bits are delivered and then discarded without being permanently stored locally at the destination.

The stream source 110 can include, for example, a media server or hub configured for streaming content over a network, such as the Internet. In some implementations, the stream source 110 can include the ADOBE® FLASH® Media Server (FMS) system, available from Adobe Systems Incorporated of San Jose, Calif. The stream source 110 can maintain a playlist of streams. In some examples, the stream 120 (and each stream in a playlist of streams) can be associated with a corresponding file stored in or accessible to the stream source 110. For example, the stream 120 can be associated with a FLV or other type of file maintained or accessible to the stream source 110. A playlist of streams can include pointers to the files corresponding to the streams.

The player 150 can include any mechanism that processes and displays the stream 120 for an end-user. The player 150 can include, for example, a client-side virtual machine configured as a standalone player or as a plugin for browsers (such as MOZILLA® FIREFOX®, OPERA™, SAFARI® and INTERNET EXPLORER®). In some examples, the player 150 can include the ADOBE® FLASH® Player runtime (available from Adobe Systems Incorporated of San Jose, Calif.), which can run for example SWF files, FLV files and/or F4V files.

During the streaming 105, a persistent connection can be established between the stream source 110 and the player 150. This connection can facilitate the streaming 105 from the source 110 to the player 150. In some implementations, the connection may be established using TCP (Transmission Control Protocol), UDP (User Datagram Protocol) and/or other protocols. For example, the player 150 may connect to the stream source 110 using RTMP (Real Time Messaging Protocol) and/or RTMFP (Real Time Media Flow Protocol).

The stream 120 can be created in a variety of ways. In some examples, the stream 120 can be generated by the stream source 110. In some examples, a client-side application 160, in which the player 150 can be embedded, can be involved in the creation of the stream 120. The application 160, for example, can make one or more calls 125 to the stream source 110 to queue a content stream for client-side playback. The stream source 110 can maintain the stream 120 and deliver the bits of the stream to the player 150 during the streaming 105 phase.

As used herein, the term "application" refers to any computer program having some defined purpose appreciable by a user. An application can include various computer programs (also referred to as programs, software, software applications, software modules, or code), which contain instructions executable and/or interpretable by a processor. An application can include one or more files containing various information, such as source code, machine code, libraries, data, documentation, configuration information, icons, or any other resources that can be used by an application and the installation procedure for that application. An application (or portion thereof) can be platform dependent or independent. The application 160 can, in some implementations, represent an application created using various application development frameworks and/or web development tools, such as ADOBE® FLEX® BUILDER™ software, ADOBE® FLASH® software and ADOBE® DREAMWEAVER® software, available from Adobe Systems Incorporated of San Jose, Calif.

In some examples, one or more publishers 190 (which can be geographically dispersed) can provide content streams (e.g., the stream 120) to the stream source 110 (e.g., for incorporation into a playlist). A publisher can include any entity that creates, updates, distributes, owns or otherwise controls or manages multimedia content. The publishers 190 can include, for example, software developers. The publishers 190 can also include, for example, end-users. In some examples, the publishers 190 can provide recorded or live content (e.g., from a webcam) to the stream source 110 for streaming to other users. In some implementations, the publisher 190 can be associated with the application 160 or another application.

While the application 160 is running and starts displaying a stream (e.g., the stream 120), several runtime and dynamic behaviors can come into play. For example, the application 160 can be deployed to various heterogeneous environments with varying degrees of network and system availabilities. The same application may be running at an environment with high bandwidth availability or at a bandwidth challenged end point not capable of receiving streams fast enough to display them at the rate at which the video is encoded. The system processing resources can also vary, for example, due to demands made by other, for example, high or higher priority applications.

To account for such runtime and dynamic behaviors, as well as for other client-side conditions, the dataflow 100 includes an event monitoring 170 phase. The event monitoring 170 can occur at various points in time throughout the dataflow 100 (including during the streaming 105). The event monitoring 170 can be periodic (e.g., every second, every 30 second, every 5 minutes, etc.) based on modifiable settings. The event monitoring 170 can be transparent to the end user, or it can be performed under the control and at the direction of the end user.

During the event monitoring 170, the player 150 can monitor and/or access various client-side conditions that can be used as a basis for dynamically altering 180 the stream 120 (or a playlist including the stream). For example, the event monitoring 170 can involve detecting and/or accessing runtime performance information, such as network bandwidth, client-side buffer capacity, a frame drop percentage, client-side processing resources (e.g., processor usage), power conditions (e.g., low battery power, energy saving operating modes, etc.), client-side audio rendering capabilities (e.g., speaker capabilities, channel attributes (multi-channel, stereo, mono), supported frequencies, high-definition capability, etc.), client-side video rendering capabilities (e.g., supported resolutions, screen size, high-definition capability, etc.) and various other performance conditions associated with the client-side receipt and playback of the stream 120. This and other information can be used to build up heuristics for the alterations 180.

At various times during the dataflow 100, the player 150 can provide results of the event monitoring 170 to the application 160. The application 160 can be configured with control logic 165 that allows the application to make decisions about altering 180 the stream 120 (or a playlist). In some examples, this control 165 can be implemented using an Application Program Interface (API). The player 150 can provide the event monitoring results to the application 160 during playback of the stream 120, and the application 160 can make dynamic decisions (using the control 165) about dynamically altering 180 the stream 120, including a stream of a playlist that is currently being played by the player 150. Although shown as part of the application 160, the control 165 can be included in the application 160, the player 150 or the application and the player. In some examples, one or more aspects of the control 165 can be distributed between the application 160 and the player 150 as a distributable library for other applications to embed inside them.

The dynamic alterations 180 can involve any type of change to one or more streams. Example alterations include, but are not limited to: replacing a stream with another before the start of the streaming or even in the middle while the original item is already streaming; reordering of the streams in a playlist; removing a stream from a playlist; and inserting a new stream into a playlist. Replacing a stream can involve switching a particular stream to a different version of the stream (e.g., switching from 500 kbps video to 300 kbps video) having a different resolution than the resolution of the version being replaced.

As used herein, the term "resolution" can refer to a quality or nature of a stream, such as bit rate, definition (e.g., high-definition or standard-definition, pixel count or resolution, spatial resolution, an audio/video characteristic (e.g., mixed audio/video, audio only, or video only), a screen or browser version (e.g., a full-screen version or a partial screen version), and the like. The resolution of a stream can impact the network and processing resources required for acceptable playback of the stream. For example, a higher resolution stream (e.g., 1.5 Mbps encoded stream) can require more network and processing resources relative to a lower resolution stream (e.g., a 500 Kbps encoded stream).

As used herein, the term "bit rate" can refer to the number of bits transmitted per predefined unit of content (e.g., per video frame). Thus, switching or changing bit rate versions of a stream can include any change in the number of bits transmitted per predefined unit of content. A change in bit rate versions can include, but is not limited to, a change in the encoding bit rate.

Replacing a stream can also involve switching out a stream for another stream having content unrelated to and/or different from content of the stream being replaced. The application 160 can effect the dynamic alterations 180, for example, by providing appropriate feedback 175 to the stream source 110. The feedback 175 can include requests for dynamic alterations 180 that are based on the event monitoring 170.

The alterations 180 can be responsive to degraded conditions, such as decreased network bandwidth, reduced power, reduced processing capability, and the like. In these situations, the alterations 180 can include replacing or down-switching the stream 120 with downshifted or downgraded versions of the same content having a lower resolution relative to the stream(s) being replaced. For example, to avoid stuttering video resulting from a detected decrease in network bandwidth, the application 160 can request that the stream source 110 replace the stream 120 with a lower bit rate version (e.g., a 1 Mbps encoding to a 500 Kbps encoding). As another example, the application 160 can request that the stream source 110 replace the stream 120 with a lower definition version (e.g., high-definition to standard definition). Other example alterations 180 include switching from a full-screen version to a partial screen version (e.g., in a browser), switching from mixed audio/video to audio only (or video only), switching from a high resolution to a low resolution, and the like.

Conversely, to exploit the full capabilities of the client-side environment, the alterations 180 can be responsive to improved conditions, such as increased network bandwidth, increased power, increased processing capability, etc. In these situations, the alterations 180 can include replacing or up-switching the stream 120 with upgraded versions of the same content. For example, the application 160 can request that the stream source 110 replace the stream 120 with a higher bit rate version. As another example, the application 160 can request that the stream source 110 replace the stream 120 with a higher definition version (e.g., standard definition to high-definition). Other example alterations 180 include switching from a partial screen version (e.g., in a browser) to a full-screen version, switching from audio only (or video only) to mixed audio/video, switching from a stereo version to a multi-channel version, switching from a low resolution to a higher resolution, etc.

To effect an alteration 180, the feedback 175 can include one or more requests that contain appropriate information identifying the desired change. For example, to effect a stream replacement, the feedback 175 can include a request that identifies the name of a stream as well as the name of a replacement stream. Upon receiving this request, the stream source 110 can look up the old stream name (e.g., in a playlist) and replace it with the new stream. If the stream source 110 is already streaming bits of the old stream, then it can compute the soonest time frame to switch to the new stream without causing any glitches or artifacts on the player 150 during playback.

Whether requesting upgraded/downgraded versions of streams or streams having unrelated and/or different content, the application 160 can include in the feedback 175 control information that specifies the type of switch desired and the desired behavior of the switch. This control information can be based on various heuristics built up from the event monitoring 170. In some examples, the player 150 and the stream source 110 can have control capability to specify insertion or deletion modes for a playlist of streams, such that the new stream can be inserted before or after the old stream or the old stream is deleted from a playlist. The stream source 110 and the player 150 can also have the capability to specify start points or offsets and the length of the new stream which should replace the old stream.

As noted above, an undesirable cycle of switching stream versions can occur due to a disparity between network bandwidth and client-side processing resources. For example, during playback of a 500 kbps video stream, the streaming video can be dynamically and automatically updated with a higher bit rate version (e.g., 1 Mbps) of the same video. This switch can occur, for example, when the buffering, bandwidth, and frame dropping factors indicate such a switch is appropriate. During playback of the higher-bit rate version, however, the higher bit rate stream may cause the system to run sluggishly due to low processing resources, even though the network has enough bandwidth to handle the stream. This can impact the number of dropped frames and trigger another version switch to a lower bit rate version (e.g., a 500 kbps encoding) of the stream. But once the frame dropping condition improves in response to the lowering of the bit rate, the system may attempt to upgrade the streaming content to a higher bit rate version again. This can result in an undesirable cycle of upgrading and downgrading stream versions.

To control such cycling, the application 160 can be configured with version switching control logic 167 that can be used to control up-switching and down-switching of the stream 120. Although shown as part of the application 160, the control 167 can be included in the application 160, the player 150 or the application and the player. Moreover, in some implementations, all or part of the functionality associated with the switching control logic 167 can be implemented on the server side.

The switching control logic 167 can be used to lock a stream bit rate into a bit rate acceptable to the client-side processing resources and network bandwidth. The switching control logic 167 can be configured to prevent any switching to upgraded versions of streams having bit rates that meet or exceed a locked out bit rate. The switching control logic 167 can use results of the event monitoring 170 (e.g., provided by the player 150) to make decisions about activating the lock. For example, the lock can be activated in response to an indication of a down-switch (e.g., from a 1 Mbps encoding to a 500 kbps encoding) resulting from a number of frames exceeding a threshold number. The locked out bit rate can be the bit rate of the stream encoding that caused the dropped frames condition that triggered the down switching (e.g., the 1 Mbps encoding in the above example). The switching control logic 167 can be configured to release the lock in response to a condition being met (e.g., after expiration of a certain amount of time). The switching control logic 167 can use a timer to control the duration of the lock.

In some implementations, the switching control logic 167 can make determinations about client-side conditions based on the amount of times the lock is activated and control the lock accordingly. For example, after a certain number of lock activations (e.g., three activations), the switching control logic 167 can conclude that a higher bit rate will likely continue to offend system processing resources and maintain a locked out bit rate for the duration of the currently-playing stream (e.g., the stream 120). In some implementations, the switching control logic 167 can decide whether or not to maintain the lock based on resolution (e.g., bit rate). For example, the switching control logic can decide to permanently (for the duration of a stream) lock out 1 Mbps after locking out this bit rate three times. In other examples, the switching control logic 167 can decide to maintain a locked out bit rate when the number of lock activations exceed a threshold, regardless of what the locked out rates were during those instances of the lock. In this case, the locked out bit rate maintained for the duration of the stream can be the most recent locked out bit rate or another default bit rate.

In addition, to avoid a cascading down-switching effect, the switching control logic 167 can prevent or delay down-switching and activation of the lock. For example, the switching control logic 167 can be configured to inspect a playback buffer output prior to allowing a down-switch and locking out a resolution to ensure that the buffer is outputting the version of the stream that is to be replaced and not residual data from a previous, higher version. If the buffer is still outputting the higher version, then the switching control logic 167 can delay or prevent the down-switch and activation of the lock.

Figure 2:
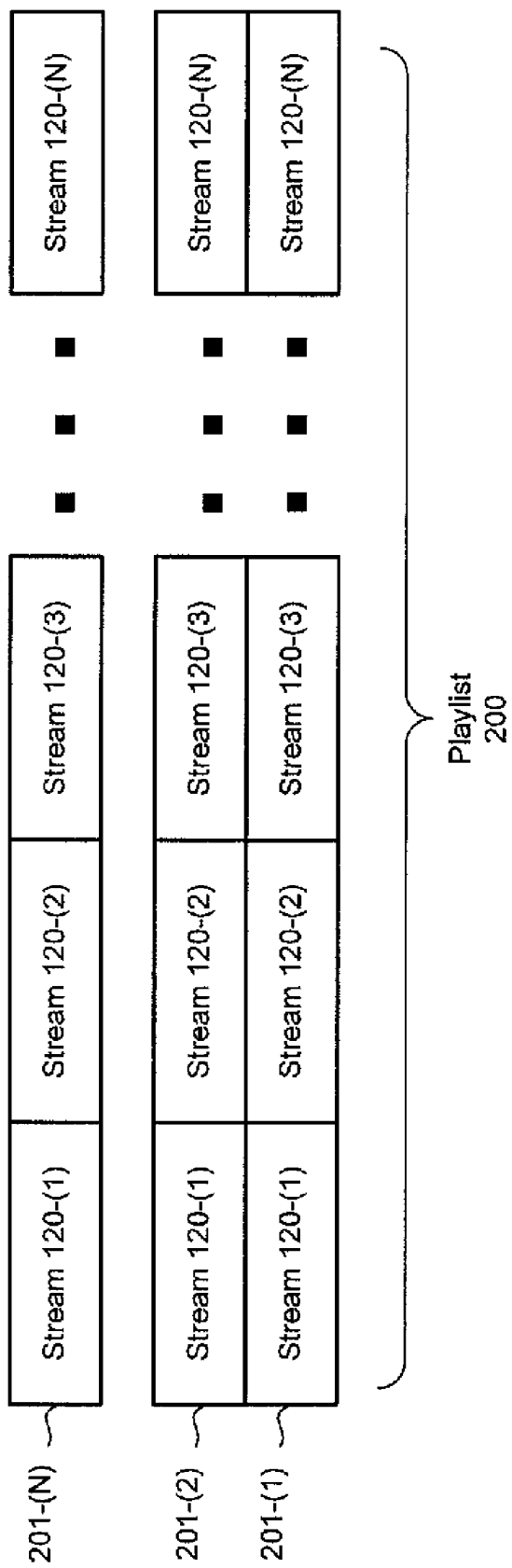
FIG. 2 is a block diagram showing a conceptual overview of a playlist.

FIG. 2 shows an example playlist 200 consistent with at least some implementations. FIG. 2 is an example only, and other playlist implementations are within the scope of this disclosure. As shown in the figure, the playlist 200 can include one or more streams 120(1)-120(N). Each of the streams 120 can include audio content, video content or both. The streams 120 can include content encoded with one or more codecs (e.g., the H.264, On2 VP6, and/or Sorenson Spark video codecs). The playlist 200 can be implemented in XML, ACTIONSCRIPT® or any other suitable language. The playlist 200 can be maintained by a streaming media server (e.g., the ADOBE® FLASH® Media Server system, available from Adobe Systems Incorporated of San Jose, Calif.), and each stream 120 in the playlist 210 can correspond to a file (e.g., SWF files, FLV files and/or F4V files) maintained by or accessible to the media server. Playlists can be maintained internally in one or more data structures (e.g., FMS data structures) in response to commands from the player application.

As shown in FIG. 2, the playlist 200 can include or be associated with one or more different versions 201(1)-201(N) of the streams 120(1)-120(N). For example, the playlist 200 can be associated with different bit rate versions of each of the streams 120. These different versions can be used during dynamic alteration of the playlist 200.

The playlist 200 can be created in a variety of ways. In some examples, the playlist 200 can be generated by the stream source 110. In some examples, the client-side application 160, in which the player 150 can be embedded, can be involved in the creation of the playlist 200. The application 160, for example, can make one or more calls 125 to the stream source 110 to add individual content streams (e.g., the stream 120) into the playlist 200. These streams can be appended one after the other to be played in a queue in the same order. In some examples, streams can be inserted into and deleted from the playlist 200 at specified insertion and deletion points. The stream source 110 maintains the playlist 200 and delivers the bits of these streams to the player 150 during the streaming 105 phase.

In some implementations, playlists can be created at the client (e.g., by a client-side application) and altered at a server (e.g., the stream source 110) that streams content over the network. Various other implementations are within the scope of this disclosure as well. For example, the playlist can be created initially at a media server and then downloaded to the client and altered at the client. As another example, the playlist can be created initially at the server and then downloaded to the client. The playlist can then be altered at the server, and the altered version can be provided to the client. In yet another implementation, the playlist can be hosted by a server other than the server performing the streaming. For example, one sever can perform streaming while another can host the playlist and alteration logic.

As noted above, the dynamic alterations 180 can alter a playlist. Example playlist alterations include, but are not limited to: replacing a stream in the playlist with another before the start of the streaming or even in the middle while the original item is already streaming; reordering of the streams in the playlist; removing a stream from the playlist; and inserting a new stream into the playlist. Replacing a stream can involve switching a particular stream to a different version of the stream having a different resolution than the resolution of the version being replaced. In some implementations, replacing a stream can involve requesting streams having unrelated and/or different content.

Figure 3:
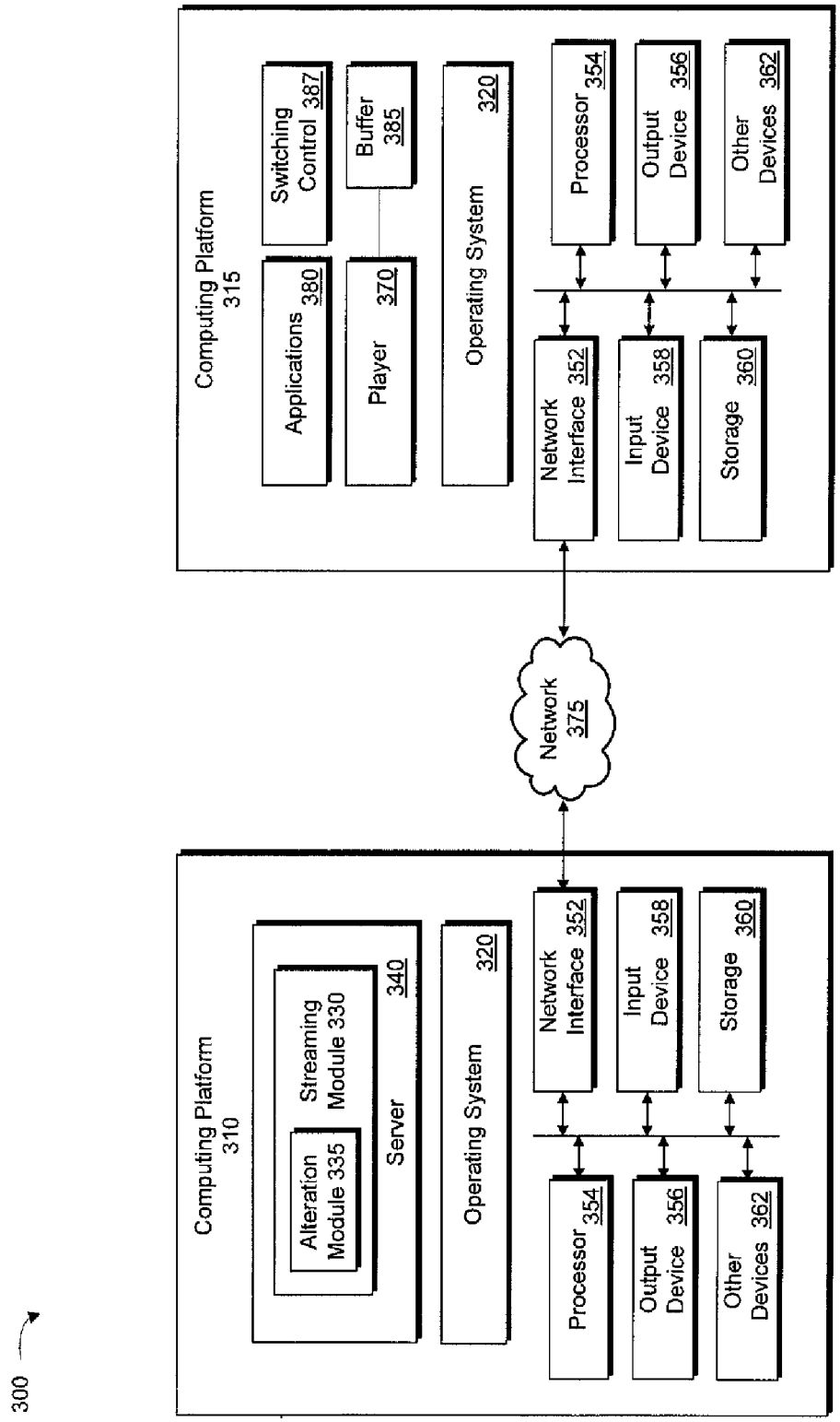
FIG. 3 is a block diagram showing an example of a data processing environment consistent with this disclosure.

FIG. 3 shows an example data processing environment 300 in which locking logic can be implemented to control stream version cycling and cascading down-switches. Separate computing platforms 310 and 315 each include hardware and software. The computing platform 310 can be configured as a streaming media server, while the platform 315 can be configured as a playback client (e.g., an end-user computer). The client 315 can include, for example, a personal computer or workstation, a laptop, a mobile phone, a set-top box, a hand-held device, or any other suitable device that can accommodate playback functionality.

The computer platforms 310 and 315 can be geographically dispersed and operatively coupled via a network 375. The network 375 can include one or more telecommunications networks, such as computer networks, telephone or other communications networks, the Internet, etc. The network 375 can include a shared, public, or private data network encompassing a wide area (e.g., WAN) or local area (e.g., LAN).

In the example configuration shown in FIG. 3, hardware on the computer platforms 310 and/or 315 can include one or more of a network interface 352, a processor 354, an output device 356, an input device 358, a storage 360 and other devices 362. One or more system buses can interconnect these components. The number, identity and arrangement of these elements are not limited to what is shown, and additional and/or different elements can be contained in or coupled with the elements shown. Further, the platforms 310 and 315 can include fewer components than what is shown. Although depicted with similar components, the platforms 310 and 315 can be configured differently, each platform having additional, fewer or different elements than what is shown as an example in the figure. For example, the client platform 315 can be a mobile device with fewer or different components from what is included in the server 310.

The network interface 352 facilitates connectivity with a network, such as the network 375. Network interface 352 can be any appropriate wireline (e.g., IEEE (Institute of Electrical and Electronics Engineers, Inc.) 1394, Universal Serial Bus (USB), etc.) or wireless (e.g., IEEE 802.11™, BLUETOOTH®, IrDA®, etc.) mechanism for facilitating unidirectional or bidirectional transmission of data between the computer platform and the network 375. The network interface 352 can include one or more network cards and/or data and communication ports.

The processor 354 can execute instructions from storage or memory, route information among components of the computer platform, and/or perform various operations on data. Each of the platforms 310 and 315 can include any number of general- and/or special-purpose processors, which can operate collaboratively or independently. In some examples, the processor 354 can include one or more application specific integrated circuits (ASICs) and/or various other circuitry. The processor 354 can include various logical elements and architectures (e.g., the von Neumann architecture, parallel architectures, etc.) and can perform various types of computational operations, such as sequential computation and parallel computation.

The output device(s) 356 can present text, images, video, audio, or any other type of information. Examples of the output device 356 include, video display devices, audio display devices, printers, and the like. The output device 356 can display user interface information for various software applications and tools running on the computer platform, as well as the operating system programs necessary to operate the system. The output device 356 can present information by way of a cathode ray tube, liquid crystal, liquid crystal on silicon, light-emitting diode, gas plasma, laser, or other type of display mechanism. The output device 356 can also be configured to receive, generate and/or present holographic or other visual representations. The output device 356 can be configured to audibly present information, and it can include suitable components for receiving and presenting audio signals. Each of the platforms 310 and 315 can include any number of similar or different output devices.

The input device(s) 358 can include components such as a keyboard, a mouse, a stylus, a pointing device, a joystick, and/or a touch screen. The input device 358 can also include audio- or video-capture devices (e.g., video cameras, microphones, etc.) and/or various sensors for capturing and processing emissions (e.g., thermal, motion, sound, etc.). It can also include one or more information reading devices (e.g., scanners, disk drives, etc.) and/or input ports. Each of the platforms 310 and 315 can include any number of similar or different input devices. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The storage 360 can provide mass storage, working (e.g., cache) memory, and/or buffer space for the system. The storage 360 can be implemented using a variety of suitable memory elements. The memory elements can include, for example, solid state elements, optical elements, polymer elements, magnetic elements, and/or organic elements (e.g., crystals). The memory elements can be volatile or non-volatile and can be randomly or sequentially accessed. The storage 360 can include random access memory (RAM), flash RAM, read-only memory (ROM), erasable programmable read-only memory (EPROM), and electrically erasable programmable read-only memory (EEPROM). The storage 360 can include one or more fixed disk drives (e.g., a hard drive, RAID storage, etc.) and one or more removable disk drives (e.g., a CD-ROM drive, DVD drive, etc.). The storage 360 can also include one or more data repositories (e.g., relational, distributed and/or object-oriented databases), which can be local and/or remote to the platform. In some examples, the storage 360 can include one or more local and/or remote network-based storage architectures, such as a storage area network (SAN). Each of the platforms 310 and 315 can include or interact with any number of individually configured storage elements 360.

The storage 360 can store program code for various applications, an operating system 320, an application-programming interface, application routines, middleware components, and/or other executable instructions. The storage 360 can include program code and information for communications (e.g., TCP/IP communications), middleware components, kernel and device drivers, invariant low-level systems code, data for basic input and output, and various configuration information.

In some implementations, the storage 360 includes at least one computer readable medium, which tangibly embodies one or more computer programs. The computer programs can contain instructions that, when executed by a processor, implement various methods (such as those described below) and/or systems. Computer readable medium refers generally to any type of computer program, apparatus and/or device (e.g., magnetic discs, optical disks, memory, Programmable Logic Devices (PLDs)) used to provide machine instructions and/or data to a processor. Computer readable media suitable for storing computer programs and data can include forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

The other devices 362 can include, for example, various devices used for video and film editing. Examples include video controllers, video recorders, audio recording systems, backup power supplies, etc. Moreover, the other devices 362 can include any digital print engine or marking engine, display monitor, or other raster output device capable of producing color or gray scale pixels on paper, film, display screen, or other output medium.

As shown in FIG. 3, the server platform 310 includes an operating system 320 and a streaming module 330, which can include and/or leverage an alteration module 335. The operating system 320 can include any suitable operating system (OS) for managing computing resources and hosting applications (e.g., WINDOWS® OS, MAC® OS, UNIX® OS, LINUX® OS, and the like).

The streaming module 330 can include any suitable component for streaming content over the network 375. In some examples, the streaming module 330 can be configured for building playlists and streaming content associated with playlists over the network 375. The streaming module 330 can be implemented in or part of a server module or application 340, which can be configured to interact with and service components of the client platform 315 (e.g., the player 370). The streaming module 330 can be configured to receive digital media and stream the received media to the client platform 315 over the network 375 according to various protocols. The streaming module 330 can be configured to store and/or access one or more streams (e.g., stream 120). In some examples, the streaming module 330 can be configured to store and/or access one or more playlists (e.g., the playlist 200) and stream content streams in those playlists to the client platform 315. Streams and playlists can be stored locally on the server platform 310 (e.g., in the storage 360). Streams and playlists can also be distributed across different machines.

In some examples, applications can make calls to the server platform 310 to queue content for streaming. In implementations involving playlists, applications can make such calls to add individual content streams into a particular playlist. The applications can provide the content streams along with the requests or can provide information identifying locations of the streams. The streaming module 330 can obtain these streams and append them one after the other in the playlist. The streaming module 330 can then deliver the bits of these streams to the client platform 315 when the content is streamed.

In some examples, the streaming module 330 can receive streams that have already been formatted using one or more codecs. In some examples, the streaming module 330 can receive unformatted (e.g., uncompressed) media (e.g., a live video feed from a user's webcam) and can be configured to format the received media into content streams using one or more codecs. Thus, in some implementations, the streaming module 330 can include and/or leverage one or more codes (such as the H.264 codec, the On2 VP6 codec, the Sorenson Spark codec, etc.) to compress received streams for streaming to the client platform 315. In some implementations, the streaming module 330 can receive a live video feed that is already encoded in a specific codec and the streaming module 330 can change that codec type when streaming the feed to a client.

The streaming module 330 can receive media through one or more interfaces and transmit content streams via one or more other interfaces. The streaming module 330 can be configured to transmit content streams (e.g., live video or other live streams) at various transmission rates, resolutions, formats, etc. The particular manner in which the content streams are streamed can depend on the alteration module 335.

The alteration module 335 can process requests for dynamic alterations (e.g., stream version switches) from the client platform 315 received over the network 375. The alteration module 335 can be configured to receive these requests and take appropriate action to effect changes in streaming content, which can be stored locally on the server platform 310 (e.g., in the storage 360). For example, the alteration module 335 can look up identified stream and replace the stream with one or more other streams having the same or different content. The alteration module 335 can also be configured, for example, to rearrange streams in a playlist, add streams to a playlist and/or remove streams from a playlist. In some examples, the alteration module 335 can include functionality for computing the appropriate time frame for switching streams without causing glitches or artifacts in the playback. Additionally, in some examples, the alteration module 335 can include functionality for specifying insertion and deletion modes for playlists, such that new streams are inserted before or after old streams or the old streams are deleted from the playlists. The alteration module 335 can also specify start points or offsets and lengths of new streams.

In some implementations, the alteration module 335 (or another component of the server platform 310) can include and/or access one or more buffers. In some examples, the alteration module 335 can be configured to initiate or trigger the buffering of streams in order to facilitate streaming content alteration. For example, when switching between live streams, the alteration module 335 can begin buffering the streams when the switch is initiated and then compute the appropriate point for switching the streams.

The streaming module 330 and the alteration module 335 can include and/or use one more data structures as well as one or more computational algorithms that can operate on various data. The modules can include sets of instructions for performing various tasks, and the modules can output information for use by users or other systems. In some implementations, the modules can include one or more engines, which can output code that serves as input to other systems, engines or processes. The modules can include and/or use various hardware and firmware elements.

The client platform 315 can include a suitable operating system 320, a player 370 and one or more applications 380. The player 370 can include client-based software that runs FLASH® and/or other applications and supports vector and raster graphics, bidirectional streaming of audio and video and one or more scripting or other languages (e.g., JAVASCRIPT®, ACTIONSCRIPT®, and the like). In some examples, the applications 380 (e.g., a FLASH®-based application) can rely on the player 370 during operation. Further, the player 370 can integrate FLASH® and other applications with the operating system 320 to provide various functionality and features to the client platform 315. In some examples, the player 370 can be implemented as a virtual machine.

The player 370 and the applications 380 are not limited to the FLASH® platform or FLASH®-based applications. The player 370 can be implemented and run in, and/or configured to run and/or support applications created with, various other platforms and environments without departing from the scope of this disclosure.

In some examples, the player 370 can include and/or access one or more playback buffers 385 to facilitate playback of streams. The playback buffers 385 can be configured to store content that is streamed to the computing platform 315 for playback as it is being processed for playback. In some examples, the playback buffer 385 can be configured to store 60 seconds of streaming content. The player 370 can use the buffers 385 to locally store a portion of an incoming stream before beginning playback of the stream. The buffers 385 can be implemented in hardware, software or a combination thereof In some implementations, the buffers 385 can be included in the storage 360. As noted above, buffer capacity or fill rate can be used a criterion for effecting an alteration of a stream (e.g., a version switch). For example, the content of the buffer 385 can be periodically checked. If the buffer content is determined to be falling relative to the last time it was checked, then this can be a factor that causes a stream version switch (e.g., switching to a lower bit rate version of the same streaming content).

In some examples, the player 370 can be implemented as an independent component that runs on the client platform 315 and/or as an embedded component. In some implementations, the player 370 can be configured to run in conjunction with a Web application. In some examples, the player 370 can be implemented as a "plug-in" type component that provides various functionality to, and extends the feature set of, one or more host applications (e.g., an application 380). Such host applications can provide services to the plug-in to allow the plug-in to interact with the host application. The host applications and/or the OS can include APIs that allow plug-ins to be added and interact with the host applications.

The applications 380 can include various computer programs, which contain instructions executable by one or more processors (e.g., the processors 354). Computer programs consistent with this disclosure can be implemented in various programming languages, such as high- or mid-level procedural and object-oriented programming languages (e.g., C, C++, JAVA®, JAVASCRIPT®, PHP, VISUAL BASIC®, etc.), low-level assembly languages (INTEL® 80x86, ARM, etc.) and/or various other languages.

The applications 380 and/or the player 370 can include and/or access a switching control module 387, which can be configured to control up-switching and down-switching of streaming content. The switching control module 387 can receive input from the applications 380 and/or the player 370 and implement a locking mechanism that controls version switching based on such input. The switching control module 387 can be configured to implement functionality associated with the switching control logic 167 described above in connection with FIG. 1. The switching control module 387 can include and/or use one more data structures as well as one or more computational algorithms that can operate on various data. The module can include sets of instructions for performing various tasks, and the module can output information for use by users or other systems. The module can include one or more engines, which can output code that serves as input to other systems, engines or processes. The module can include and/or use various hardware and firmware elements.

Although shown as a discrete module within the client platform 315, the functionality of the switching control module 387 can be distributed among various elements. Moreover, in some implementations, all or part of the functionality associated with the switching control module 387 can be implemented on the server side.

In some implementations, the client platform can include a runtime environment that provides various utility services for use by the applications 380. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provide using a runtime library. Moreover, the runtime environment can include an API that provides services to applications and abstracts details of various hardware and OS platforms on which the runtime environment has been configured to operate.

The discrete modules shown in FIG. 3 are used herein for purposes of explanation only, and various other arrangements are within the scope of this disclosure. For example, the various functionality of these modules can be distributed or exist in more or less modules than what is shown in the figure. The particular configuration, arrangement and feature set of the individual modules will typically depend on the particular operating environment.

Figure 4:
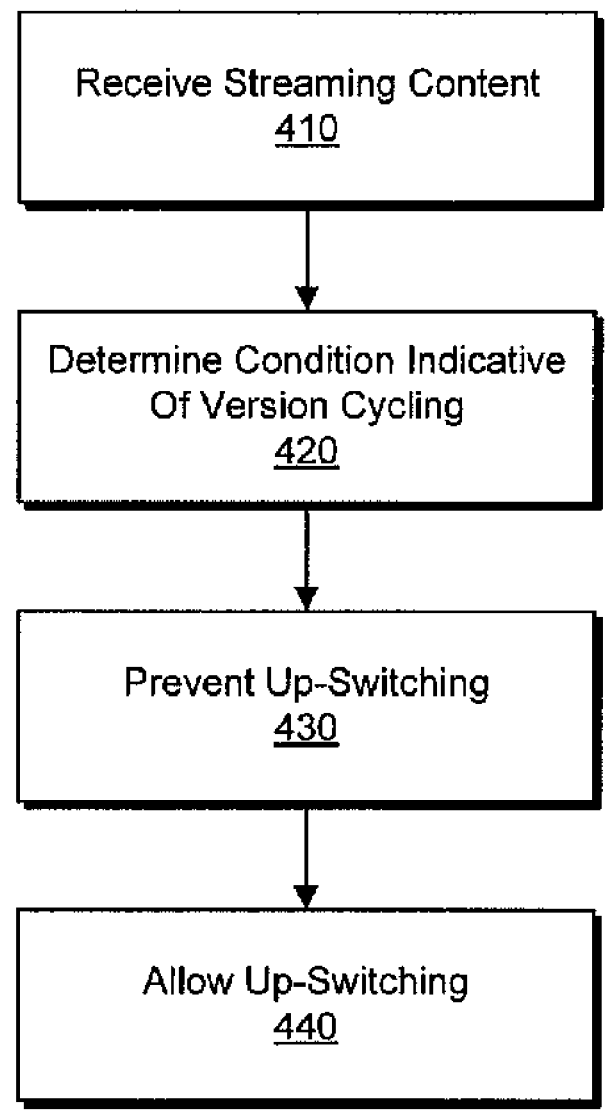
FIG. 4 is a flow diagram showing an example of a stream switching control process.

FIG. 4 is a flow diagram showing an example process 400 for controlling stream version cycling consistent with this disclosure. The process 400 can be performed by one or more elements in the data processing environment 300. The process 400 can be performed by one or more processors (e.g., the processor 354 in the client platform 315) executing one or more instructions from storage or memory. The process 400 can be performed on the server side or the client side, or it can be performed partly on the server side and partly on the client side. The process 400 can involve receiving 410 streaming content; determining 420 a condition indicative of a cycle of switching versions of the streaming content; preventing 430 any up-switching to a stream version having a resolution that meets or exceeds a locked resolution; and allowing 440 up-switching after expiration of a predetermined condition.

The process 400 can receive 410 streaming content. This can involve a client (e.g., the client platform 315) receiving from a server (e.g., the server 310) one or more streams (e.g., the stream 120) that are queued for client-side playback. In some examples, the receiving 410 can include a client receiving from a server one or more streams associated with a playlist (e.g., the playlist 200). In some examples, the received playlist can be created by a client-side application. The client-side application can interact with and send requests to the server to build the playlist. The playlist can include an ordering of streams that are queued for client-side playback from the server according to the ordering. In some implementations, the playlist can be stored locally on the server-side.

The received streaming content can include, for example, an audio stream, a video stream, and/or a mixed stream having both audio and video. In some examples, the streaming content can include a live stream. For example, the streaming content can include a stream from an information capture device (e.g., a video camera) that is recording a live football game. A playlist can include a mix of live streams and recorded streams. As an example, a playlist can include live streams of a football game being recorded mixed with pre-recorded streams corresponding to commercials or advertisements. In some examples, the received streams can include various data content, such as text data, still image data and/or other user defined marshaled (e.g., serialized for transmission) data formats.

The process 400 can determine 420 a condition indicative of a cycle of switching versions (e.g., between high and low bit rate versions) of the streaming content. This can involve, for example, identifying a particular type of client-side condition and/or a particular type of alteration to the streaming content that indicates that version cycling can occur. In some implementations, the determining 420 can involve determining that multiple versions of the streaming content are available and that one of those versions (e.g., a lower bit rate version) is optimal.

As noted above, various types of dynamic alterations can be requested during playback of streamlining content in response to various client-side conditions. Dynamically altering a stream can involve a client-side application sending the server a request for a particular alteration of the stream. The particular alteration can be responsive to certain client-side conditions or factors. In some examples, client-side conditions can be monitored by the player 370 on the client platform 315, either independently of the user of the client device or at the direction of the user. The player 370, for example, can track the client-side conditions and provide the information to a client-side application, which can make decisions about altering the streaming content based on built up heuristics.

Alterations can include a down-switch from a high resolution video stream (e.g., a 1 Mbps encoding) to a lower resolution (e.g., a 300 kbps encoding) version. Conversely, alterations can include an up-switch from a lower resolution version to a higher resolution version. In some implementations, these types of alterations can be made based on various client-side conditions of factors, such as (1) bandwidth (e.g., whether available bandwidth exceeds the current bit rate), (2) buffer capacity or fill rate (e.g., whether the content of the playback buffer 385 is falling) and (3) processing resources (e.g., whether a percentage of dropped frames exceeds a target percentage). For example, if all three of the above factors are positive (e.g., bandwidth exceeds bit rate, buffer content is not falling, and dropped frame percentage is on target), then an up-switch can be requested. As another example, if the drop frames percentage exceeds a target, then a down-switch can be requested. For instance, if a detected frame rate (e.g., 20 frames/sec) is determined to be below a target (e.g., 30 frames/sec), then a down-switch can be requested.

The determining 420 can involve identifying or detecting a particular alteration, a request for a particular alteration and/or a particular client-side condition. For example, the determining 420 can involve identifying or detecting a down-switching that is responsive to a dropped frames condition (e.g., the number of dropped frames exceeding a threshold number) or a request for such a down-switch. In some implementations, the determining 420 can involve identifying or detecting a particular client-side condition (e.g., a frame dropping condition) that causes a stream version down-switch that replaces a first version of the streaming content with a downgraded version that has a lower resolution relative to the first version. For example, this can involve identifying a reduction in frame rate (e.g., from 30 frames/sec to 20 frames/sec) or that a computed dropped frames percentage exceeds a threshold value, which can trigger a change in bit rate encodings from a higher bit rate (e.g., 1 Mbps) encoding to a lower bit rate (e.g., 300 kbps) encoding of the same streaming content.

The process 400 can prevent 430, in response to the determined condition indicative of cycling, any up-switching to a stream version having a resolution that meets or exceeds a locked out resolution. This can involve activating a switching lock that prevents any up-switching to a stream version having a resolution that meets or exceeds the locked out resolution. The preventing 430 can involve the client-side player 370 and/or a client-side application (e.g., an application 380) using locking logic to prevent any up-switching to a resolution that meets or exceeds a locked out resolution.

In some examples, the locked out resolution can be set as the offending resolution. That is, the locked out resolution can be the resolution that caused the down-switch that triggered the lock. For example, if the lock is triggered by a down-switch from a 1 Mbps version of a video stream to a 300 kbps version of that stream, then the locked out resolution (or locked out bit rate in this example) can be 1 Mbps. In some implementations, the lock may be configured to allow up-switches to resolutions that do not exceed the locked out resolution. In the above example, the lock may allow up-switches to bit rates (e.g., 500 kbps or 800 kbps) below the locked out rate of 1 Mbps.

The preventing 430 can involve setting a lock timer used to control the duration of the switching lock. In some cases, the client-side processing resource deficiency causing the down-switch is temporary. For example, processing resources can be temporarily taken away from the player and given to other high or higher priority applications running on the system but then freed up for the player at a later time. To account for this, the process 400 can activate a time-based lock configurable for self release in order to allow a higher resolution version of the streaming content to be tested again at a later time.

The process 400 can involve allowing 440 up-switching after expiration of a predetermined condition. The allowing 440 can involve deactivating the switching lock after expiration of a predetermined amount of time (e.g., 5 minutes). This can involve deactivating the switching lock when the lock timer expires. Deactivating the switching lock allows up-switching to and beyond the locked out resolution again.

During the time when up-switching is prevented (e.g., the switching lock is active), the streaming content can be displayed (e.g., by a client-side display device) at resolutions below the locked out resolution. Displaying streaming content can involve the client presenting to the end-user (e.g., via one or more display devices) the streaming content. In some examples, during the time the lock is active, the process 400 can involve displaying (e.g., by a client-side display device) a notification (e.g., an error message) related to the switching lock. For example, a notification can be presented to the end-user every time the switching lock is activate. In some examples, in response to an attempt to up-switch to an upgraded version having a resolution that meets or exceeds the locked out resolution when the switching lock is active, the process 400 can display a notification that the switching lock is preventing the attempted up-switch. The notifications can be presented in various formats using various delivery methods.

Figure 5:
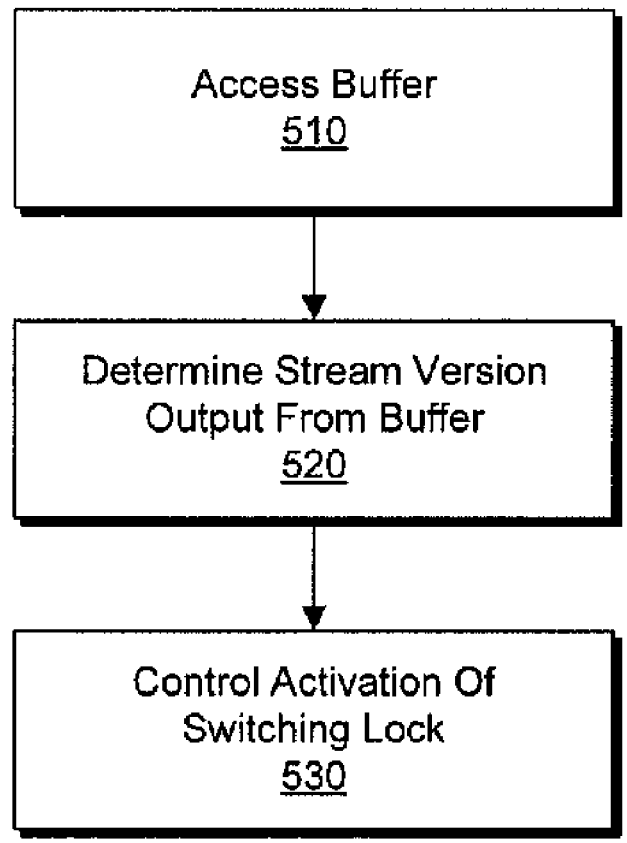
FIG. 5 is flow diagram showing an example of a process for controlling activation of a switching lock.

In some implementations, the process 400 can (e.g., as part of the activating 430) include additional stages for controlling activation of the switching lock (and down-switching) to prevent a cascading down-switching effect. FIG. 5 is a flow diagram showing an example process 500 including such additional stages. The process 500 can be performed prior to the preventing 430 stage of the process 400. The process 500 can be performed by one or more processors (e.g., the processor 354 in the client platform 315) executing one or more instructions from storage or memory.

The process 500 can begin, in some implementations, in response to a client-side frame dropping condition that triggers a down-switch. For example, the process 500 can begin in response to a detected reduction in frame rate (e.g., from 30 frames/sec to 20 frames/sec) or a computed dropped frames percentage exceeding a threshold value. The process 500 can include accessing 510 a client-side buffer (e.g., the playback buffer 385) associated with the streaming content and determining 520 which version of the streaming content is being output from the buffer. For example, in response to a frame dropping condition that can trigger a down-switch from 500 kbps encoding to a 300 kbps encoding, the process 500 can determine whether the buffer is outputting the version of the stream that is to be replaced (e.g., the 500 kbps encoding) or a previous, higher resolution version (e.g., a 1 Mbps encoding) of the streaming content. That is, the process 500 can determine whether any previous version of the streaming content has cleared the buffer. In some examples, the determining 520 can involve ascertaining whether the buffer is outputting the version of the streaming content that caused the down-switch used to triggered the lock (e.g., the condition indicative of cycling) or some previous, higher resolution version.

The process 500 can involve controlling 530 down-switching and activation of the switching lock based on the determined version of the streaming content being output from the buffer. When the buffer is outputting the offending version triggering the down-switch (e.g., when any previous version clears the buffer), then the controlling 520 can allow down-switching and allow activation of the switching lock to prevent any up-switching to a stream version having a resolution that meets or exceeds the resolution of the offending version. When the buffer is outputting a version of the stream having a resolution higher than the resolution of the offending version (e.g., a version that caused a prior down-switch that has not yet cleared the buffer), then the controlling 530 can delay or prevent down-switching and activation of the switching lock to avoid cascading down-shifting. Delaying the activation can involve delaying activation for a predetermined amount of time.

Figure 6:
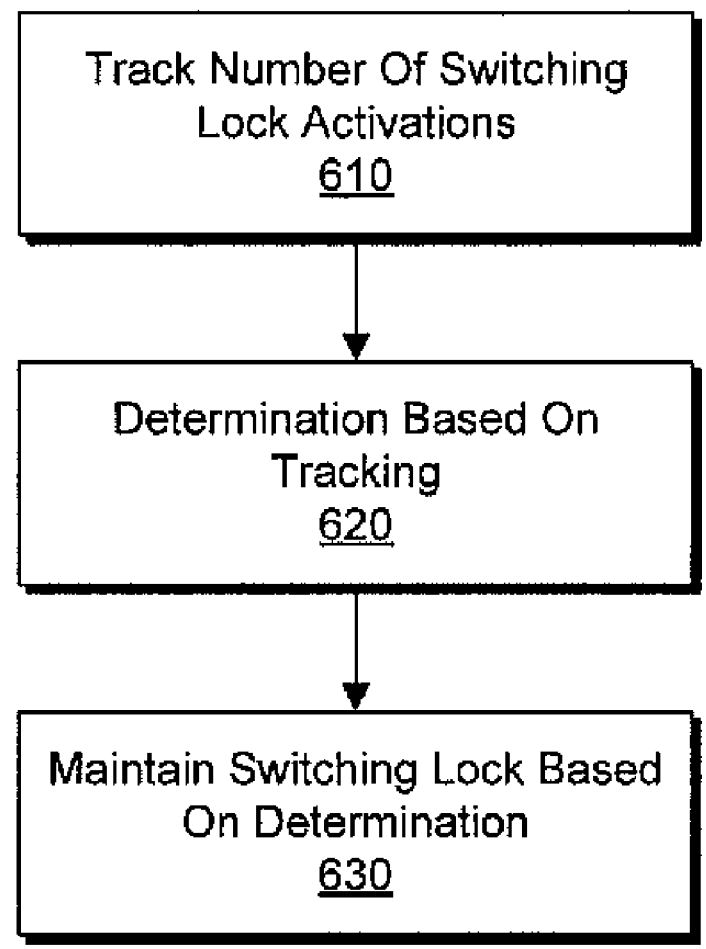
FIG. 6 is a flow diagram showing an example of a switching lock tracking process.

FIG. 6 is a flow diagram showing an example process 600 for tracking a number of switching lock activations consistent with this disclosure. The process 600 can be performed by one or more elements in the data processing environment 300. The process 600 can be performed by one or more processors (e.g., the processor 354 in the client platform 315) executing one or more instructions from storage or memory. The process 600 can be performed on the server side or the client side, or it can be performed partly on the server side and partly on the client side. The process 600 can be used to limit the number of attempts to up-switch to a finite number. The process 600 can involve tracking 610 a number of activations of the switching lock; making a determination 620 about client-side processing resources based on the tracking; and maintaining 630 the switching lock based on the determination.

The process 600 can track 610 a number of activations of the switching lock. This can involve setting up an incident counter and then incrementing the counter in response to certain events. In some examples, the incident counter can be incremented every time the switching lock is activated (or every time the lock timer is started). In some examples, the incident counter can be incremented every time an attempt to switch to a certain locked out resolution is made. In some examples, the tracking 610 can involve tracking, for each different resolution of a stream, the number of times the resolution is locked out during the playback of the stream. For example, if 300 Kbps, 500 Kbps and 1 Mbps encodings of a stream are available, the tracking 610 can involve tracking the number of times the 1 Mbps encoding is locked out and the number of times the 500 kbps resolution is locked out.

The process 600 can make a determination 620 or conclusion about client-side processing resources based on the tracking. For example, after a threshold number of switching lock activations (e.g., three), the process 600 can determine that higher resolution versions of the streaming content (relative to the currently-streaming version) will likely continue to offend system resources. Likewise, after a threshold number of attempts to up-switch to the locked resolution (e.g., during a particular instance of the lock), the process 600 can determine that the locked rate will permanently offend system resources. In some examples, the process 600 can determine 620 that a certain resolution will likely offend system resources. For example, the process 600 can determine that the 1 Mbps resolution will likely offend system resources after locking out this bit rate three times.

The process 600 can maintain 630 the switching lock based on the determination about client-side processing resources. Maintaining 630 the switching lock can involve making the lock permanent for the entire duration of the currently-streaming stream. Alternatively, maintaining 630 the switching lock can involve extending the duration of the lock, for example, by modifying the lock timer. In some implementations, maintaining 620 the switching lock can involve locking out a certain resolution for the duration of a stream or another amount of time. For example, the maintaining 630 can involve locking out 1 Mbps for the duration of a particular stream.

In the case of playlists, the switching lock can persist across streams, or not, depending on the context. For example, when moving from one stream to another in a playlist, the switching lock may not carry over. Since each stream in the playlist may use a different codec, the determination 620 about client-side resources made for one stream may not be appropriate for other streams. Thus, the lock can be configured to deactivate or reset every time a new stream is encountered. In other examples, however, the switching lock can be configured to persist across streams. That is, maintaining 630 the switching lock can involve making the lock permanent for the duration of multiple streams or the entire duration of the playlist. The lock can be configured in this manner, for example, when multiple streams in the playlist use the same codec.

Figure 7:
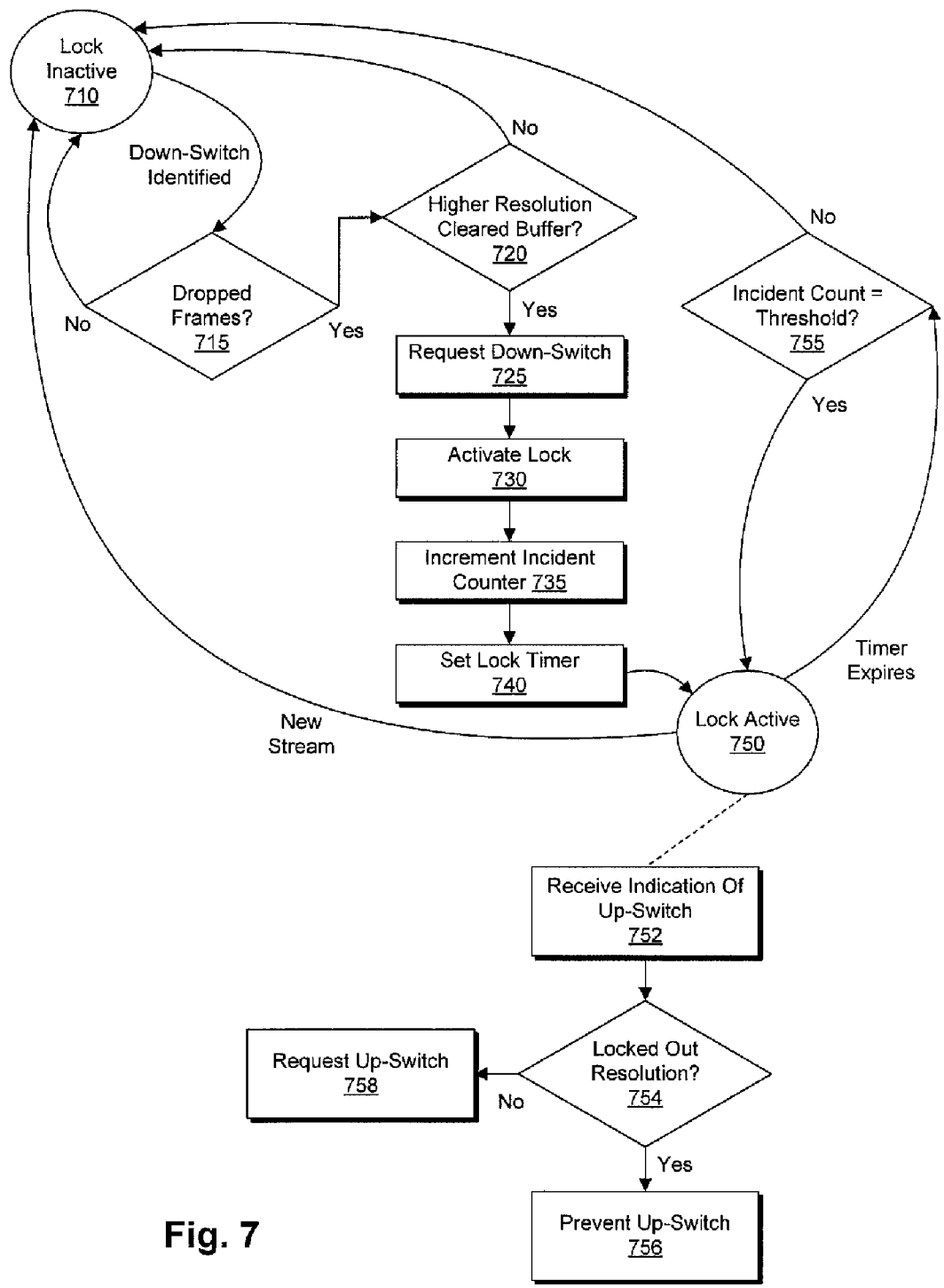
FIG. 7 is a combined state diagram and flow diagram showing aspects of an example of a stream switching control process.

FIG. 7 is a combined state diagram and flow diagram showing an example process 700 for controlling stream version cycling consistent with this disclosure. The process 700 can be performed by one or more elements in the data processing environment 300. The process 700 can be performed by one or more processors (e.g., the processor 354 in the client platform 315) executing one or more instructions from storage or memory. The process 700 can be performed on the server side or the client side, or it can be performed partly on the server side and partly on the client side.

The process 700 can begin in the lock inactive 710 state. In this state, streaming content can be received and client-side playback conditions can be monitored. This can involve the client platform 315 receiving a stream (e.g., stream 120) from the server 310 via the network 375. Various client-side playback conditions (e.g., bandwidth, dropped frames, and buffer capacity) can be monitored during playback of the received stream.

As a result or as part of event monitoring, dynamic alterations can be identified or triggered. For example, an up-switch can be identified when, for example, available bandwidth exceeds the bit rate of the stream, the buffer fill rate is not dropping and a percentage of dropped frames is below a threshold percentage. Alternatively, a down-switch can be triggered when one or more of these and/or other factors indicate that a down-switch is appropriate. In the lock inactive state 710, a currently-playing version of a stream can be up-switched to versions having a higher resolutions relative to the currently-playing version.

If a down-switch is determined to be appropriate during the lock inactive 710 state, the process 700 can determine 715 whether the cause of the down-switch is related to a frame dropping condition (e.g., a frame drop percentage is below a threshold percentage). If frame dropping is not the cause, then the process 700 can remain in the lock inactive state 710, proceed with the down-switch, and receive and playback the downgraded stream. If frame dropping is the cause, then the process 700 can perform additional checks. This can involve checking 720 a playback buffer to determine whether higher resolution versions (relative to the version triggering the potential down-switch) have cleared the buffer, to avoid a cascading down-switching effect. In some implementations, performing the buffer checking 720 can involve performing stages similar to those of process 500 described above in connection with FIG. 5.

The checking 720 can determine, for example, whether the stream version to be replaced is being output from the buffer or whether the buffer contains or is outputting residual data from a previous, higher resolution version. If residual data has not yet cleared the buffer, then the process can exit and continue in the lock inactive 710 state without down-switching versions of the currently-streaming stream. If residual data has cleared the buffer and the buffer is outputting the downgraded version, then the process 700 can request 725 the down-switch and proceed to prepare for activation of the lock.

After checking 720 the buffer, the process 700 can activate 730 a switching lock to prevent any up-switches to versions of the stream having resolutions that meet or exceed a locked resolution. The locked resolution can be the resolution that triggered the down-switch causing activation of the lock. For example, if the down-switching transitions from a 1 Mbps version of a stream to a 500 kbps version, then the locked resolution can be the 1 Mbps resolution. The process 700 can then increment (or initiate) 735 an incident counter, which can be used to track the number of lock occurrences.

The process 700 can also set 740 a lock timer, which can be used to control the duration of the lock. Once the lock has been activated, the process 700 can enter into the lock active 750 state. In the lock active 750 state, the process 700 can continue to receive and playback the stream. With the lock active, however, continued playback and alteration of the received stream is restricted by the lock (e.g., up-switching of a currently-playing version of a stream to any version having a resolution that meets or exceeds the locked out resolution is not allowed).

Once the lock timer expires (e.g., after 5 minutes), the process 700 can prepare to exit the lock active 750 state. This can involve determining 755 whether the incident count exceeds a threshold count (e.g., three). If the incident count is below a threshold number (e.g., three), then the process 700 can deactivate the switching lock and return to the lock inactive state 710, which allows up-switching to and beyond the locked out resolution. If the incident count exceeds the threshold number, then the process 700 can remain in the lock active 750 state for the duration of the stream.

In the example implementation shown in FIG. 7, switching locks may not persist beyond a single stream. Thus, the process 700 may transition from the lock active 750 state to the lock inactive 710 state when the currently-streaming stream ends and a new stream is received. As a result, even if the incident count exceeds the threshold, the process 700 can transition to the lock inactive 710 state when a new stream (e.g., the next stream in a playlist) is received. This is an example only, and other implementations in which the switching lock can persist beyond a single stream are within the scope of this disclosure. In such implementations, the switching lock can maintained by extending the duration of the lock for a predetermined amount of time. Extending the lock duration can involve re-setting and/or modifying the lock timer.

As noted above, while in the lock active 750 state, continued playback and alteration of the received stream is restricted by the lock. In this state, the process 700 may receive 752 an indication of an up-switch, which can be part of or result from monitoring of client-side conditions. When such an indication is received, then the process 700 can determine 754 whether the desired up-switch involves a switch to a version of the stream having a resolution (e.g., encoding bit rate) that meets or exceeds the locked out resolution. If the desired resolution meets or exceeds the locked resolution, then the process 700 can prevent 756 the up-switching. If the desired resolution is below the locked resolution, then the process 700 can proceed to request 758 the up-switching to a higher resolution version of the stream.

Figure 8:
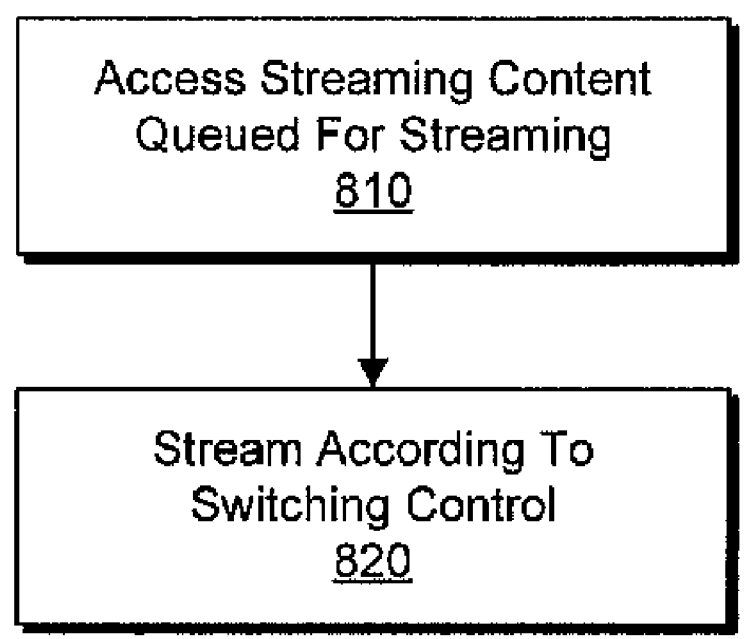
FIG. 8 is a flow diagram showing an example of a streaming process, which can represent aspects of server-side operations.

FIG. 8 is a flow diagram showing an example of a streaming process 800, which can represent aspects of server-side operations. The process 800 can be performed by one or more elements in the data processing environment 300. The process 800 can be performed by one or more processors (e.g., the processor 354 in the server platform 310) executing one or more instructions from storage or memory. The process 800 can involve accessing 810 streaming content queued for streaming to a client and streaming 820 to the client one or more versions of the streaming content according to switching control.

The process 800 can access 810 streaming content queued for streaming to a client. This can involve a server (e.g., server platform 310) accessing one or more locally stored streams. The server can maintain multiple versions of the streaming content having different resolutions. For example, the server can maintain a first resolution version (e.g., a 1 Mbps encoding) and a second resolution version (e.g., a 500 kbps encoding) having a higher resolution relative to the first resolution version.

The process 800 can involve streaming 820 to the client one or more versions of the streaming content according to switching control. For example, when a switching lock that prevents up-switching to a certain locked out resolution (e.g., 1 Mbps) is active, the streaming 820 can involve streaming to the client one or more versions of the streaming content having a resolution (e.g., 500 kbps) lower than the locked out resolution. As discussed above in connection with FIG. 4, the switching lock can be activated in response to a condition indicative of a cycle of version switching. In some examples, streaming according to switching control can involve maintaining a version of the streaming content currently-streaming to the client unchanged when the switching lock is active.

The streaming 820 according to switching control can involve streaming to the client a higher (relative to the currently-streaming version) resolution version (e.g., the 1 Mbps encoding) when the switching lock is inactive. This can involve switching a currently-streaming version to a higher resolution version. In some examples, the switching lock can deactivate after a expiration of a predetermined amount of time and when an incident counter, which can be used to track the number of lock occurrences, is below a threshold number. Streaming the higher resolution version can be responsive to an up-switch request received from the client. The up-switch request can include, for example, information identifying the up-switch alteration and information that controls the up-switch. The process 800 can access and stream the higher resolution version based on information provided in the received up-switch request. As an example, the up-switch request can include old and new stream names, and the streaming 830 can involve looking up an old stream and a new stream and then replacing the old stream with the new stream.

The sequences of events shown in FIGS. 4-8 are examples and not intended to be limiting. Other processes can therefore be used and, even with the processes 400, 500, 600, 700 and 800 depicted in FIGS. 4-8, events can be re-ordered, added and/or removed as appropriate. Furthermore, the elements of the processes can overlap and/or can exist in fewer stages than the number shown in the figures. In some examples, processes can be re-arranged and configured to accommodate and/or exploit multitasking and parallel processing techniques and/or other aspects of various system architectures.

Although the following description refers to streaming, aspects of this disclosure can apply to other media delivery techniques.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the disclosure have been described. Other implementations are within the scope of the following claims. For example, the actions recited in the claims can be performed in a different order and still achieve desirable results.

What is claimed is:

1. A computer-implemented method, comprising:
    receiving, from a server, streaming content queued for client-side playback from the server;
    determining, at a client-side application, a condition indicative of a cycle of switching versions of the streaming content during playback of the streaming content, the versions having different bit rates requiring different network and processing resources;

responsive to the determined condition, preventing up-switching to a stream version having a bit rate that meets or exceeds a locked out bit rate, wherein the locked out bit rate is determined from the condition indicative of a cycle of switching versions;

displaying the streaming content on a client-side display device at a bit rate below the locked out bit rate when up-switching is prevented; and allowing the prevented up-switching to a stream version having a bit rate that meets or exceeds the locked out bit rate after expiration of a predetermined condition, wherein at least the determining, the preventing and the allowing are performed by at least one data processing apparatus, and wherein determining a condition indicative of a cycle of switching versions comprises identifying a stream version down-switching that replaces a first version of the streaming content with a downgraded version having a bit rate that requires less network and processing resources relative to a bit rate of the first version, the stream version down-switching being responsive to a number of dropped frames associated with the streaming content exceeding a target number.

2. The method of claim 1, wherein the allowing comprises:
allowing the prevented up-switching after expiration of a predetermined amount of time.

3. The method of claim 1, wherein the stream version down-switching comprises a change in bit rate encodings from a first bit rate encoding to a second bit rate encoding lower than the first bit rate encoding.

4. The method of claim 3, wherein the preventing comprises:
preventing any up-switching to a bit rate encoding that meets or exceeds a bit rate of the first bit rate encoding.

5. The method of claim 4, wherein the preventing comprises:
allowing up-switching to bit rate encodings having bit rates below the bit rate of the first bit rate encoding during the preventing.

6. The method of claim 1, further comprising:
prior to the preventing:
accessing a client-side buffer associated with the streaming content;
determining whether the buffer is outputting the first version of the streaming content or a version of the streaming content having a bit rate higher than the bit rate of the first version;
when the buffer is outputting the first version, preventing any up-switching to a stream version having a bit rate that meets or exceeds the bit rate of the first version; and
when the buffer is outputting a version of the stream having a bit rate higher than the bit rate of the first version, allowing stream version up-switching without the preventing.

7. The method of claim 1, further comprising:
in response to an attempt to up-switch to an upgraded version having a bit rate that meets or exceeds the locked out bit rate when up-switching is prevented, displaying on the client-side display device a notification that the attempted up-switch is being prevented.

8. The method of claim 1, further comprising:
tracking a number of instances of the preventing using a counter;
making a determination about client-side processing resources when a threshold number of preventing instances is exceeded; and
preventing up-switching to a stream version having a bit rate that meets or exceeds the locked out bit rate for an entire duration of the streaming content based on the determination about client-side processing resources.

9. A machine-readable storage device storing a computer program product, the computer program product having instructions operable to cause one or more data processing apparatus to perform operations comprising:
accessing streaming content queued for streaming to a client, the streaming content associated with at least a first bit rate version and a second bit rate version having a higher bit rate relative to the first bit rate version;
streaming, to the client over a network, the first bit rate version when a switching lock that locks out the second bit rate is active, the switching lock being activated at the client in response to a condition indicative of a cycle of switching versions of the streaming content during playback of the streaming content;
receiving from the client an up-switch request for an upgraded version of the streaming content when the switching lock is inactive, the switching lock deactivating after expiration of a predetermined condition; and
streaming the second bit rate version to the client via the network in response to the up-switch request.

10. The storage device of claim 9, wherein the condition indicative of a cycle of switching versions comprises:
a stream version down-switching that replaces the second bit rate first version of the streaming content with the first bit rate version, the stream version down-switching being responsive to a number of dropped frames associated with the streaming content exceeding a target number.

11. The storage device of claim 10, wherein the second bit rate version has a higher bit rate encoding relative to the first bit rate version.

12. The storage device of claim 11, wherein the switching lock prevents any up-switching to a bit rate encoding that meets or exceeds the encoding bit rate of the second bit rate version.

13. A system, comprising:
at least one processing device; and
a storage device storing instructions operable to cause the at least one processor to perform operations comprising:
receiving, from a server, streaming content queued for client-side playback from the server;
determining, at a client-side application, that multiple versions of the streaming content are available and that one of the versions is optimal, the optimal version having a bit rate that requires less network and processing resources relative to the other of the multiple versions;
responsive to the determination, activating a switching lock that prevents up-switching to a stream version having a bit rate that meets or exceeds a locked out resolution;
displaying the streaming content on a client-side display device at a bit rate below the locked out resolution when the switching lock is activated; and
deactivating the switching lock after expiration of a predetermined condition.

14. The system of claim 13, wherein the predetermined condition includes a predetermined amount of time.

15. The system of claim 13, wherein the determining comprises:
identifying a change in bit rate encodings from a first bit rate encoding of the streaming content to a second bit rate encoding of the streaming content lower than the first bit rate encoding, and wherein activating the switching lock prevents any up-switching to a bit rate encoding that meets or exceeds a bit rate of the first bit rate encoding.

16. The system of claim 13, wherein the operations further comprise:
prior to activating the switching lock:
accessing output of a client-side buffer associated with the streaming content; and
determining whether or not to activate the switching lock based on the buffer output.

17. The system of claim 13, wherein the operations further comprise:
tracking a number of activations of the switching lock using a counter;
making a determination about client-side processing resources when a threshold number of switching lock activations is exceeded; and
maintaining the switching lock for an entire duration of the streaming content based on the determination about client-side processing resources.

18. The system of claim 13, wherein the streaming content includes streams associated with a playlist, the playlist including an arrangement of streams that are queued for client-side playback from the server, and wherein the determining comprises:
determining that multiple versions of a stream in the playlist are available and that one of the versions is optimal, the optimal version having a bit rate that requires less network and processing resources relative to the other of the multiple versions.

19. The system of claim 18, wherein the operations further comprise:
tracking a number of activations of the switching lock using a counter;
making a determination about client-side processing resources when a threshold number of switching lock activations is exceeded; and
maintaining the switching lock for an entire duration of the stream in the playlist based on the determination about client-side processing resources.

* * * * *